United States Patent [19]
Swatty et al.

[11] 3,987,625
[45] Oct. 26, 1976

[54] COMBINED SENSOR AND CONTROL
[75] Inventors: Eugene E. Swatty, Painesville;
William Wilson Lyth, Cleveland,
both of Ohio
[73] Assignee: Fluid Controls, Inc., Mentor, Ohio
[22] Filed: Aug. 15, 1975
[21] Appl. No.: 604,925

[52] U.S. Cl.................................. 60/431; 60/459;
417/34
[51] Int. Cl.²..................... F15B 15/18; F16D 31/00
[58] Field of Search ............ 60/423, 431, 459, 468,
60/494; 417/34

[56] References Cited
UNITED STATES PATENTS
| | | | |
|---|---|---|---|
| 2,690,712 | 10/1954 | Foote................................... | 417/34 |
| 2,942,421 | 6/1960 | Hann et al. ........................... | 60/423 |
| 3,159,965 | 12/1964 | Woolley et al..................... | 417/34 X |
| 3,459,131 | 8/1969 | Senf................................. | 60/423 X |

*Primary Examiner*—Edgar W. Geoghegan
*Attorney, Agent, or Firm*—John Harrow Leonard

[57] ABSTRACT

The combined sensor and control comprises a flow sensor through which passes working hydraulic fluid delivered by a pump through a hydraulic power circuit to a hydraulically operated power mechanism which is subjected to variations in load. The sensor senses incipient changes in a preselected rate of flow of the working hydraulic fluid by detection of very slight changes in the differentials in the pressure of the working fluid at opposite sides of a restricting orifice through which the working fluid is constrained to pass. These differentials in pressure, or pressure drops, operate a pneumatic pressure control device by which pneumatic pressure supplied to an actuator through a circuit, isolated from the working hydraulic circuit, is controlled. The pressure control device causes the applied pneumatic pressure to be varied almost instantly in a manner analogous to the slight variations in the normal preselected differential in pressure across the orifice. The actuator, in turn, is drivingly connected to the throttle of an internal combustion engine which drives the pump, and is operated by the applied pneumatic pressure to move the throttle to increase the fuel intake of the engine as the flow of the hydraulic fluid through the sensor decreases slightly, and to decrease the fuel intake as the flow of hydraulic fluid through the sensor increases slightly. The control device is exceedingly sensitive so as to operate upon incipient changes in the rate of flow and maintain a substantially constant preselected rate of flow of working hydraulic fluid to the power mechanism under fluctuations in the applied load.

11 Claims, 16 Drawing Figures

COMBINED SENSOR AND CONTROL

BACKGROUND OF THE INVENTION

1. Field of the Invention

A combined sensor and control for maintaining constant flow of hydraulic working fluid under varying loads.

2. Prior Art

In many types of equipment employing hydraulic power mechanisms which are subjected to varying loads, the hydraulic mechanism is connected in a circuit so as to be driven by a pump which, in turn, is driven by a prime mover. Often, in a given operating cycle, the load imposed on the mechanism varies from very light to extremely heavy. If the input of the prime mover to cause it to operate at a given speed for a light load is maintained constant, the prime mover cannot operate at the same speed for a heavier load. On the other hand, if the input is maintained constant for a heavy load the prime mover will operate at a very high speed if the load is reduced, thus creating undue noise, wastage of fuel, and subjection of the driven mechanism to severe inertial forces.

To overcome these and other disadvantages, various types of controls have been devised for changing the input to the prime mover in response to the hydraulic pressure demands imposed by the load. Most frequently the prime mover is an internal combustion engine of the gasoline operated type and the input is the fuel supply to the engine. This supply is controlled by a conventional throttle which generally is spring closed and which can be opened to varying degrees manually or by various types of throttle actuating devices so as more nearly to balance the output of the engine with the instant load being imposed by the hydraulic mechanism being operated.

SUMMARY

In accordance with the present invention, the input to the prime mover is controlled in response to the rate of flow of hydraulic fluid itself from the pump to the mechanism to be operated so that a constant flow of hydraulic fluid to the mechanism is maintained regardless of changes in the load being imposed on the power mechanism. As a result, the mechanism is driven at substantially constant speed whether the load be very light or extremely heavy. This is accomplished primarily by causing the delivered working hydraulic fluid to pass through a sensing orifice for operating an extraneous control by which the pressure drop across the orifice is converted into an analogous change in the pressure applied by the pressure fluid of a control circuit, which is isolated from the hydraulic circuit, to an actuator which, in turn, controls the input to the prime mover. The control of the actuator is such as to increase the input to the prime mover in event of a slight or incipient reduction in the normal fluid pressure drop across the orifice, and to reduce the input into the prime mover upon a slight or incipient increase in the pressure drop across the orifice. In this manner, the speed of the prime mover and pump remain substantially constant independently of the load at a preselected speed at which objectionable noise, power waste, and severe inertial forces are eliminated.

DESCRIPTION OF THE PREFERRED EMBODIMENT

For the purposes of illustration, the invention is shown connected by a hydraulic power circuit with a hydraulic mechanism in which the pump is driven by an internal combustion gasoline engine of which the input or fuel supply is under the control of a conventional spring closed throttle which may be opened to varying degrees manually or otherwise for controlling the engine speed. The pump shown in the illustrative example may be a conventional fixed displacement pump adequate to supply preselected maximum power requirements to be imposed on the hydraulic mechanism by the load.

Figure 1:
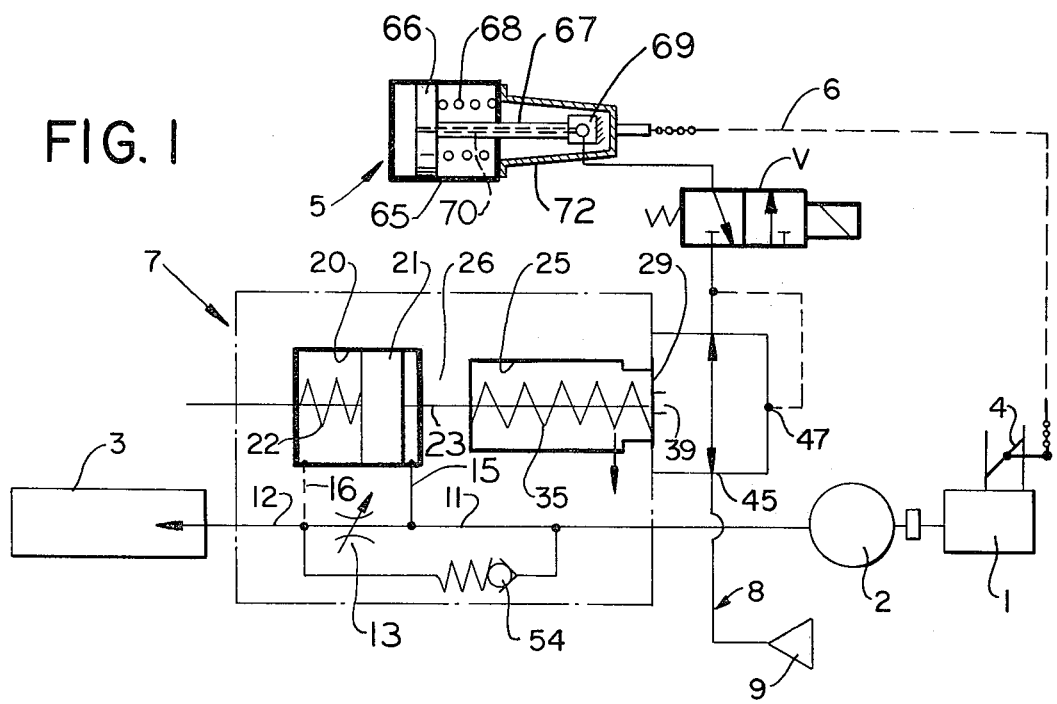
FIG. 1 is a diagrammatic illustration of the combined sensor and control and the combination thereof with circuitry, embodying the principles of the present invention.
Figure 2:
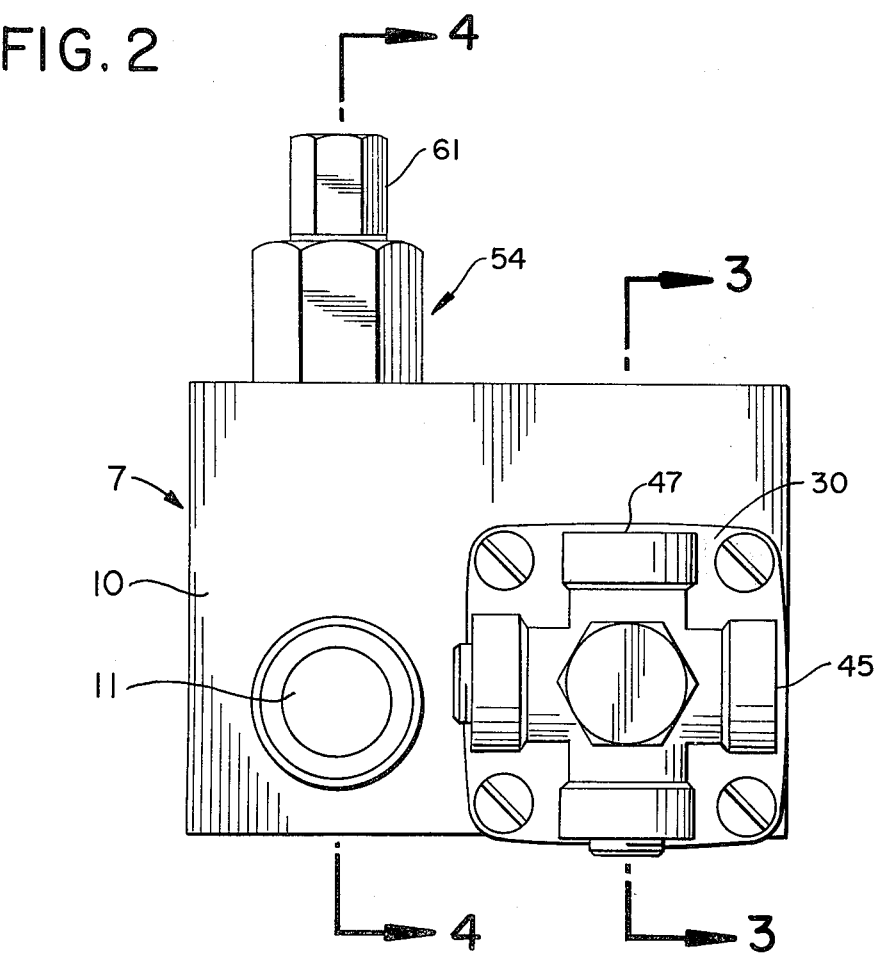
FIG. 2 is a right end elevation of the combined sensor and control employed in the circuitry of FIG. 1.

Referring to FIG. 1, an internal combustion engine 1 drives a hydraulic pump 2 which supplies working pressure fluid through a power circuit to a hydraulically operated power mechanism or load 3. A conventional throttle 4 controls the fuel intake of the engine 1. A throttle 4 is actuated by an actuator 5, which is mechanically connected thereto by a suitable bead chain 6.

Hydraulic working fluid is supplied to the load 3 through a combined sensor and control designated generally at 7, which controls the delivered fluid pressure of a control circuit 8 which connects a source 9 to the actuator 5. A conventional solenoid operated On-Off valve V is provided for connecting the control fluid circuit to, and disconnecting the control circuit from, the actuator 5, at the will of the operator.

The engine 1 is shown for purposes of illustration as a conventional gasoline fueled type, but other types of engines, such as a variable speed electric motor or a Diesel engine, for example, may be employed. The pump 2 may be the conventional fixed delivery pump. The load 3 may be a power piston and cylinder assemblage. In the example, the control circuit 8 is a pneumatic circuit, the source 9 being compressed air.

Figure 3:
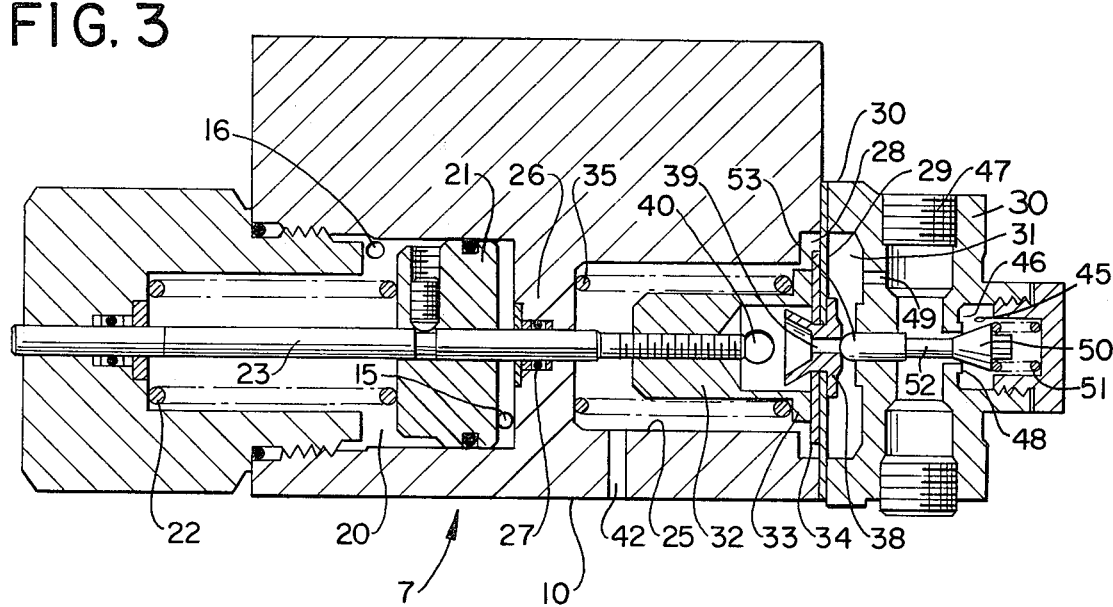
FIG. 3 is a longitudinal vertical sectional view of the combined sensor and circuit control illustrated in FIG. 2, and is taken on the line 3—3 of FIG. 2.
Figure 4:
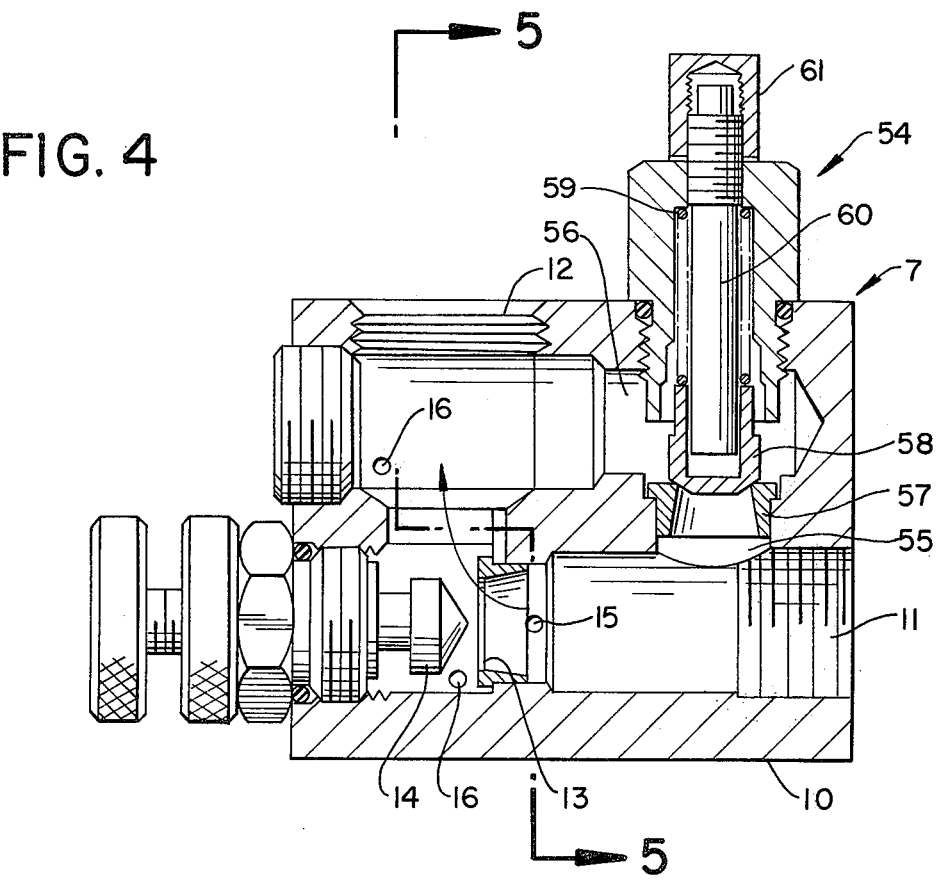
FIG. 4 is a vertical longitudinal sectional view of the combined sensor and control of FIG. 2, and is taken on the line 4—4 thereof.
Figure 5:
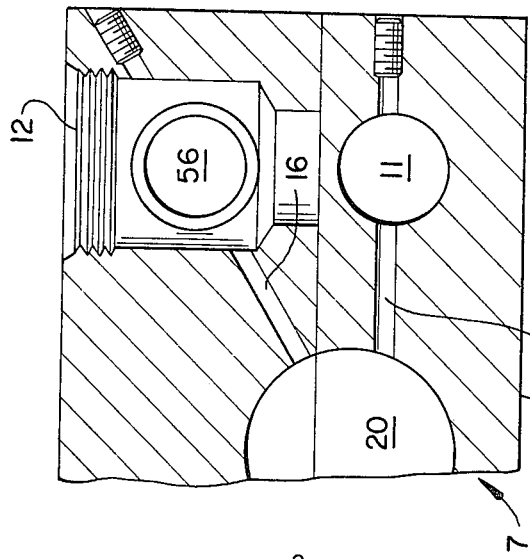
FIG. 5 is a vertical cross sectional view taken on the line 5—5 of FIG. 4.

Referring to FIGS. 3 through 5, the combined sensor and control 7 comprises a body 10, having an inlet 11 connected to the pump 2 and an outlet 12 connected to the load 3. Within the body cavity, between the inlet 11 and outlet 12, is a flow restricting orifice 13 which, in the form illustrated, is shown as adjustable by means of a needle valve 14. In such a structure the working pressure fluid is constrained to flow through the orifice. This flow creates a pressure drop across the orifice, the pressure being greater at the inlet side of the orifice than at the outlet side of the orifice. This pressure drop or pressure differential is employed for detecting the change in the normal rate of flow and supplying an analogous signal to the control for the pneumatic circuit 8 which is isolated from the power circuit. FOr example, the orifice may be set by the needle valve 14 for a normal flow of one gallon per minute or, by increments, up to forty gallons per minute. Throughout the range, an adequate pressure drop is created across the orifice for use in controlling the pneumatic control circuit 8.

The body is provided with an upstream duct 15 having its inlet connected to the body cavity at the upstream side of the orifice 13, and a downstream duct 16 having its inlet connected to the body cavity at the downstream side of the orifice 13. In order to apply this pressure drop for controlling the pneumatic control circuit, the body 10 is provided with a bore 20 in which is reciprocable a piston 21. The opposite end of the duct 15 is connected to the bore 20 near one end so as to lie at one face of the piston 21 in all positions of the piston 21. The opposite end of the duct 16 is connected to the bore 20 in spaced relation to that of the duct 15, so as to lie at the opposite side of the piston 21 in all positions of the piston 21.

The piston is biased in a direction inwardly of the body cavity by means of a spring 22 to a maximum inward position which is near the inner end of the bore 20. The spring is of preselected strength and in the illustrative example applies 50 pounds pressure to the piston.

In the structure thus far described, the orifice 13, the inlet passage 11 and outlet passage 12 are in the same body as the bore 20.

Generally, the body 10 should be close to the pump where it may be subjected to extraneous splash and atmospheric contamination. In order that the moving control parts of the structure be placed in a less contaminated location, the control mechanism may be in a separate body. In such an installation, the inlet 11, the outlet 12, and the orifice 13 therebetween are located in a position remote from the bore 20 and the bore 20 and the outlet portions of the duct 15 and duct 16 may be formed entirely within a separate body. The inlet portions only of the ducts are formed in the body 10 in which the orifice is located. Suitable tubes connect the inlet portions of the ducts, respectively, to the outlet portions which latter, in turn, are connected to the bore 20. The separate body may be located remote from the orifice containing body 10.

The piston 21 has a double end stem or rod 23 which is secured in fixed relation axially to the piston for reciprocation therewith. The double end rod provides hydraulic balance of the piston so that it can respond to extremely low variations in the pressure drop across the orifice. Hence, incipient pressure drop can be detected and the differentials in pressure in the bore 20 are so small that almost frictionless seals can be provided around the rod 23, thereby reducing friction and rendering the piston more quickly responsive.

The body 10 has another bore 25 coaxial with the bore 20 and separated therefrom by a partition wall 26 having a passage through which the rod 23 extends from the bore 20 into the bore 25. A suitable seal 27 is provided about the rod 23 to prevent the escape of pressure fluid from the bore 20 into the bore 25. The outer end 28 of the bore 25 is closed by a diaphragm 29 which is held in place by a suitable cap 30. The cap 30 has a concavity open toward the diaphragm so as to define therewith a chamber 31.

In order to transmit axial forces from the piston to the diaphragm the end of the rod 23 adjacent the diaphragm is provided with a diaphragm actuator 32 which is shown in the form of an open ended cup having a cavity which opens toward the diaphragm 29 and which at its open end has a flange 33. The flange 33 bears against a plate 34 which is movable axially of the bore 25 with the diaphragm 29. The diaphragm actuator 32 is biased by a spring 35 in the same direction as the piston 21 is biased by its spring 22, or to the right in FIG. 3. If desired, instead of the two separate springs 22 and 35, a single spring may be used. For example, the spring 22 may be selected so that it has the strength characteristics equivalent to the total of both springs 22 and 35, or the spring 35 may be selected so that it has the strength characteristics equivalent to the total of both springs 35 and 22.

Mounted on the diaphragm 29 is a by-pass element 38 having a by-pass duct 39 therethrough connecting the chamber 31 and the cavity in the diaphragm actuator 32. This latter cavity is connected by a hole 40 with the interior of the bore 25. The body 10 has a venting duct 42 which connects the bore 25 to the atmosphere, thus providing a passage from the chamber 31 through the by-pass duct 39, hole 40, bore 25 and venting duct 42 to the atmosphere.

The cap 30 is provided with a portion which has an inlet bore 45 connected to the pneumatic pressure source 9 of the pneumatic pressure control circuit 8 isolated entirely from the hydraulic power circuit. The cap 30 has a valving bore 46 and an outlet bore 47 connected to the bore 46 through an annular valve seat 48. The outlet bore 47 is also connected by a duct 49 to the chamber 31.

Mounted in the valving bore 46, in coaxial relation to the by-pass duct 39 in the by-pass element 38 is a valve 50 which is biased toward the seat 48 by means of a spring 51. The valve 50 has a stem 52 on the inner end of which is a plug 53 which is complementary to the seat on the by-pass element 38 in closing relation to the by-pass passage 39 for closing the said by-pass passage when the diaphragm 29 is in the normal condition, as when the circuit is in idle condition and the diaphragm is unstressed by fluid pressure. In this condition, the by-pass element 38 is forced against the plug 53 sufficiently tightly to hold the valve 50 open so that when the air in the control circuit 8 is turned ON, it can flow immediately from the inlet bore 45, past the valve 50, into the discharge bore 47 and thence, on the one hand, to the actuator 5 and concurrently through the duct 49 to the chamber 31, pressurizing the chamber 31 to the same degree as the inlet bore 45. This pressure from the source 9 biases the diaphragm 29 away from the plug 53, or to the left in FIG. 3, tending to permit the valve 50 to move toward closed position and thereby to reduce the flow through the annular valve seat 48. However, this pressure is not enough to cause complete release of the valve plug 53 from the by-pass element 38 so that the valve 50 can seat. Instead, a slight flow of air is maintained through the by-pass duct 39. In this condition a full supply of air from the source is admitted to the actuator 5, thus causing the actuator 5 to open the throttle 4 and thereby speed up the engine 1.

As the engine speeds up, the pressure drop in working hydraulic fluid across the orifice 13 is reflected in the ducts 15 and 16. The resultant differential in pressure is applied to the piston 21 and urges the piston to the left in FIG. 3, against the bias of the springs 22 and 35. This movement tends to allow the valve 50 to be moved by its spring 51 toward the seat 48 and also moves the by-pass element 38 in a direction away from the plug 53. If this movement were to continue sufficiently, the air in the chamber 31 would be by-passed to the atmosphere through the duct 42, thereby causing a reduction in the effective pressure of the air in the outlet bore 47 and hence on the actuator 5. Such a reduction causes the actuator 5 to operate the throttle 4 so as to slow down the engine 1. Upon slowing down of the engine 1, the pressure drop across the orifice 13 decreases with the result that the piston is moved to the right by the springs 22 and 35, gradually closing the by-pass duct 39 and, after its closure, opening the valve 50. Thus if the sensed fluid pressure differential, preselected by adjustment of the orifice, falls below normal the by-pass is closed and the valve 50 is opened wide. If the differential exceeds that preselected, the valve 50 is closed, the by-pass is opened, and the air in the chamber 31 is bled to atmosphere.

This operation continues until a balance is effected in which the by-pass duct and valve 50 are closed, and the piston holds a preselected position, maintaining a null control circuit. When the combined sensing and control combination is at rest, as when the air and pressure fluid are cut off so that no flow of hydraulic fluid and no admission of air pressure occurs, the piston moves toward the right in its bore 20 and the valve 50 is opened, ready for operation when the hydraulic fluid and air are turned on.

When air is turned on, it is freely admitted to the discharge passage 47. Concurrently it is admitted to the chamber 31 and since the by-pass duct 39 is closed and the valve 50 is open, the pressure is built up both in the discharge passage 47 and the chamber 31. The air pressure in the chamber 31 biases the diaphragm 29 to the left from its normal retracted position toward an extended position. In the normal position of the diaphragm, the actuator 5 is subjected to full air pressure and is moved to hold the throttle 4 wide open.

When the engine 1 is started, a differential in pressure is built up almost instantly at opposite sides of the piston 21. This differential forces the piston 21 to the left against the bias of the springs 22 and 35. As the piston 21 moves to the left a slight distance, it opens the by-pass duct 39 slightly, thereby venting part of the air supplied to the chamber 31 and bore 47, through the venting duct 42 to the atmosphere. The resultant reduction in air pressure in the outlet bore 47 results in the actuator 5 reducing the fuel supply to the engine 1, which slows down the rate of flow of hydraulic fluid, bringing it to the preselected rate of flow. If, due to a load increase, the flow at the existing engine speed begins to drop, the pressure drop across the orifice decreases, whereupon the piston 21 moves to the right in FIG. 3, reducing the effective size of the by-pass duct 39. This reduces the by-pass of air from the chamber 31 and outlet bore 47 and hence increases the air pressure therein and applied to the actuator 5. Increase of the applied air causes the actuator 5 again to move the throttle 4 towards open position, increasing the fuel supply to the engine and bringing the rate of flow of hydraulic fluid through the orifice to the original established rate.

The sensor and control combination is so sensitive that the hydraulic pressure drop across the orifice 13 occasioned even by incipient changes in the rate of flow, combined with the pneumatic pressure applied on the diaphragm, cause the combined sensor and control to reach the null condition heretofore described, creating a static balance against the two biasing springs 22 and 35. If the load increases, the preselected pressure drop instantly begins to decrease and the piston 21 moves to the right, closing the by-pass duct 39, and opening the valve 50, thereby causing the actuator 5 to operate under higher air pressure and hence to increase the fuel supply to the engine so as to bring the pressure drop up to the preselected level. On the other hand, if the load is suddenly removed, the pressure drop increases. This causes the piston 21 to move to the left, closing the valve 50, and opening the by-pass duct 39, so as to reduce the pressure of the air applied to the actuator 5, thereby reducing the supply of fuel to the engine 1.

To protect the structure in event of some unexpected happening which would greatly increase the hydraulic pressure beyond safe limits, such, for example, as an operator closing the needle valve 14 entirely, or reducing it below a minimum prescribed setting such as below a gallon per minute, a relief valve 54 is provided for connecting the inlet bore 11 directly to the outlet bore 12 in by-passing relation to the orifice 13.

In the form illustrated, the by-pass is through a bore 55 in the body 10. The bore 55 is connected to the inlet bore 11 and, in turn, to a bore 56 which is connected to the outlet bore 12. A suitable annular seat 57 is provided in the bore 55. A relief valve plug 58 is biased to seating position on the seat 57 by means of an overload relief spring 59. The pressure at which the valve opens is governed by the strength of the spring 59. The valve plug 58 is guided by a suitable stem 60 secured in place by a cap 61.

Figure 8:
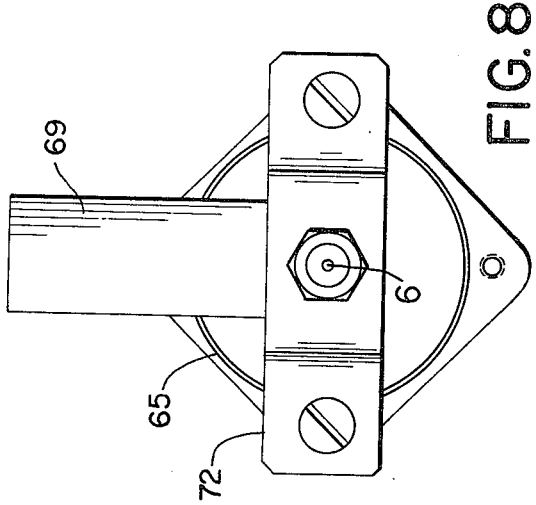
FIG. 8 is a right end elevation of the actuator illustrated in FIGS. 6 and 7.
Figure 6:
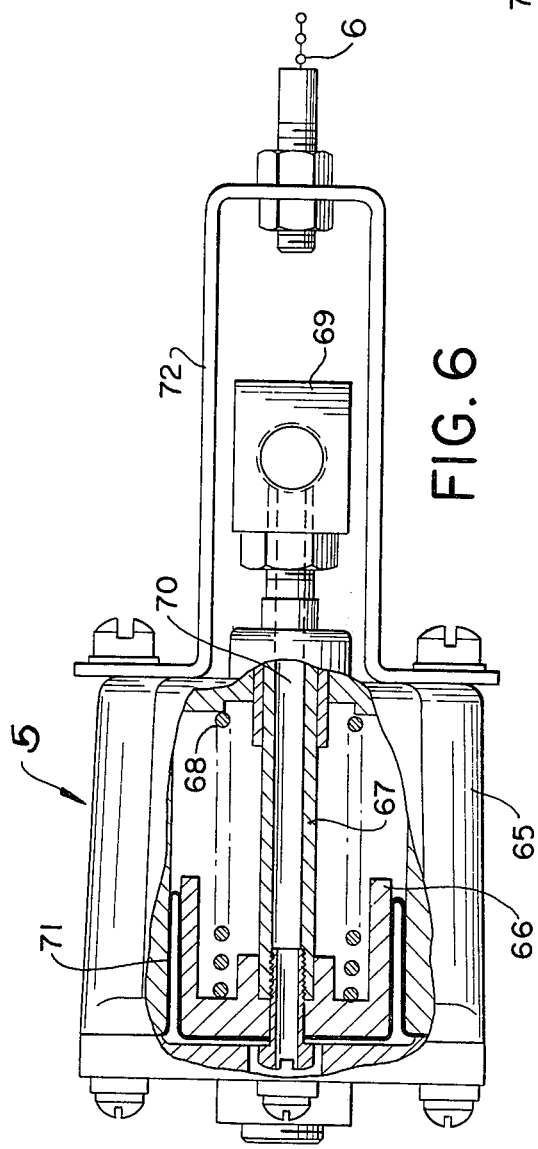
FIG. 6 is a top plan view, partly in section, showing the actuator controlled by the combined sensor and control.
Figure 7:
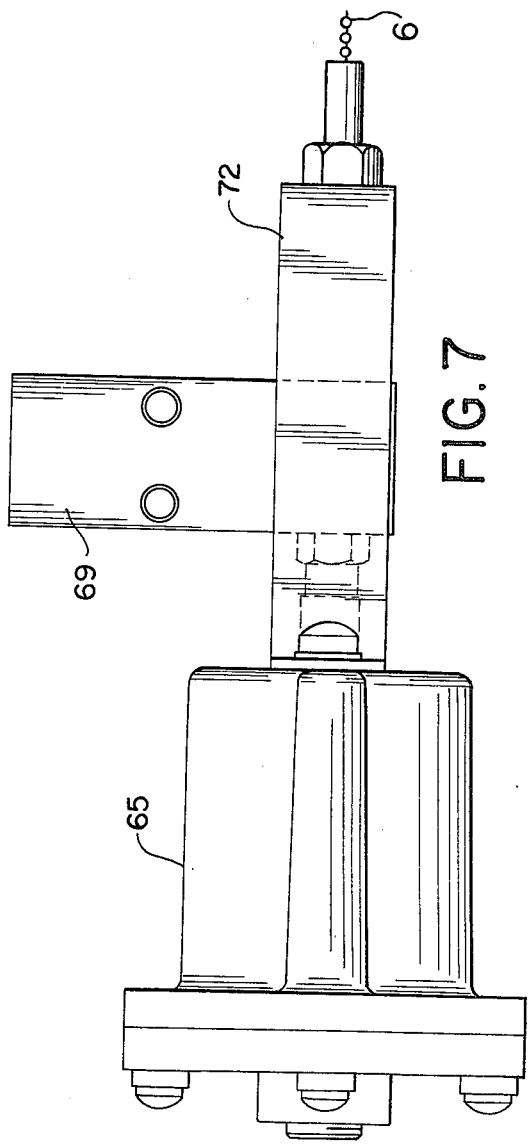
FIG. 7 is a front elevation of the actuator illustrated in FIG. 6.

Referring next to FIGS. 6 through 8, the actuator 5, operable in response to the air pressure supplied from the control circuit 8 is illustrated. The actuator 5 comprises a cylinder 65 in which is reciprocable a piston 66 of the bellows-diaphragm type. The piston 66 has a stem or rod 67. The piston is biased toward bottomed position to the left in the cylinder 65 in FIG. 6 by a spring 68. The stem 67 is fixedly connected to an air inlet post 69 which, in turn, is connected to a support, not shown, so as to remain in fixed position relative to the stem 67. The stem 67 has an axial air inlet duct 70 which admits air from the control circuit 8 into the cylinder at the head end of the piston 66. In order to reduce friction to a minimum so that the device is quickly responsive, the bellows type diaphragm, employing a bellows 71, is connected to the piston 66 and to the cylinder 65 so as to permit the piston 66 to operate in the cylinder without any substantial frictional drag on the cylinder walls. The stem 67 fits the end of the cylinder with sufficient clearance to bleed air into and out of the right end of the cylinder 65. When air under pressure is admitted into the inlet duct 70 in the stem 67, it passes through the duct 70 into the cylinder 65 at the left hand face of the piston 66. The cylinder 65 is free to move relative to the piston and the post 69. Since the piston rod 67 is fixedly mounted in the air inlet post 69, the cylinder is driven to the left in FIG. 6. Carried on the cylinder 65 is a yoke 72 which, in turn, is connected by the bead chain 6 to the throttle 4 so as to operate the throttle in the opening direction in proportion to the increase in pressure of the air admitted to this cylinder. The throttle 4, as mentioned, is returned to closed position automatically by its conventional return spring, not shown, when the cylinder 65 is moved to the right by the spring 68 to the bottomed position of the piston 66.

With this type of bellows-piston actuator 5 no seal is required around the stem 67, and thus, since the piston 66 itself is not in frictional engagement with the walls of the bore of the cylinder 65, the force required to operate the actuator 5 is greatly reduced, and the actuator 5 and thereby the entire control system, is rendered extremely sensitive.

In the idle position of the structure, the air supply to the duct 70, and hence to the actuator 5, is disconnected by the solenoid operated On-Off valve V. Generally, the solenoid of the valve V is connected so that upon connecting the pump 2 to the engine 1, the valve is operated to connect the air supply 9 to the duct 70 of the actuator 5 so as to subject the actuator 5 to full line pressure of the air in the control circuit 8, and thereupon operate the actuator 5 to increase the speed of the engine upon the preselected level. In this condition the valve 50 is unseated and the diaphragm 29 is positioned with the by-pass duct 39 closed by the plug 53. This full pressure air, however, is also admitted to the chamber 31 and biases the diaphragm to the left. After the pressure drop across the orifice 13 has reached the selected amount, as determined by the springs 22 and 35, any further increase in the pressure drop causes the piston to move to the left against the bias of the springs 22 and 35, thus reducing the force applied by the diaphragm actuator 32 on the diaphragm 29. Consequently, due to the force of the air in the chamber 31, the diaphragm is moved to the left, permitting the valve 50 to close or approach almost to closed position, and at the same time opening the by-pass duct 39 so that the air applied to the actuator 5 is the line pressure supplied to the inlet bore 45 as reduced by the escape of air through the by-pass duct 39. This reduces the air pressure to the actuator 5 and consequently the actuator 5 tends to return toward its normal inoperative position, thus permitting the throttle 4 to move toward closed position and reduce the engine speed. However, reduction in the speed of the engine causes a reduced flow across the orifice, whereupon the springs 22 and 35 move the piston 21 toward the right, thus reducing the by-pass of air through the by-pass duct 39 and eventually opening the valve 50 slightly for again increasing the pressure of the air supplied to the actuator 5 so that it tends to move to open the throttle 4 and increase the engine speed to restore normal drop across the orifice 13. The pressure drop desired for a preselected flow is determined by the setting of the needle valve 14, the more nearly closed the needle valve, the greater the pressure drop for a given flow in the working circuit.

The hydraulic circuit and control circuit tend to reach a null balance, in which the seating of the valve 50 and the opening of the by-pass are so closely related as to provide a pressure in the pneumatic control system analogous to slight incipient changes in the pressure drop across the orifice, and hence control in response to a signal analogous to the rate of flow. The valve 50 is just barely open at the selected pressure drop. A direct relation and balance is maintained between the hydraulic flow or pressure drop and the pneumatic pressure applied to the actuator 5. It is to be noted that the pneumatic pressures to which the actuator 5 is responsive are continuously shifting and have only momentary values unless and until the applied load is constant.

The needle valve makes it possible to establish a variety of orifice conditions suitable for a range of flow sensing values, for example, from 1 gallon per minute to 40 gallons per minute in a given installation. Opening of the needle valve induces a less pressure drop for the flow of a given volume by hydraulic fluid across the orifice, which, in turn, causes an application of greater pneumatic pressure to the actuator 5 and, in turn, a higher engine speed for maintaining the greater volume of flow.

While the adjustable orifice has distinct advantages, as noted, it is preferable in some instances that the orifice be very sharp edged, such as one provided by a hole drilled or punched in a very thin plate or disc. With such a fixed orifice, the effect on the pressure drop under temperature changes is negligible. They are less sensitive to changes in viscosity of the hydraulic fluid and hence more accurate in repeatability under wide temperature extremes. Further, they are less costly to produce. They eliminate the danger of an inadvertent shut off of the flow which can occur with a needle adjustable orifice. As a result, a spring loaded relief valve can be eliminated in many cases. However, these are suitable only where the range of load is so well established that no adjustment is required. They do lend themselves, however, to a less expensive orifice structure and a more direct flow of the hydraulic fluid in those instances in which they can be used.

Figure 9:
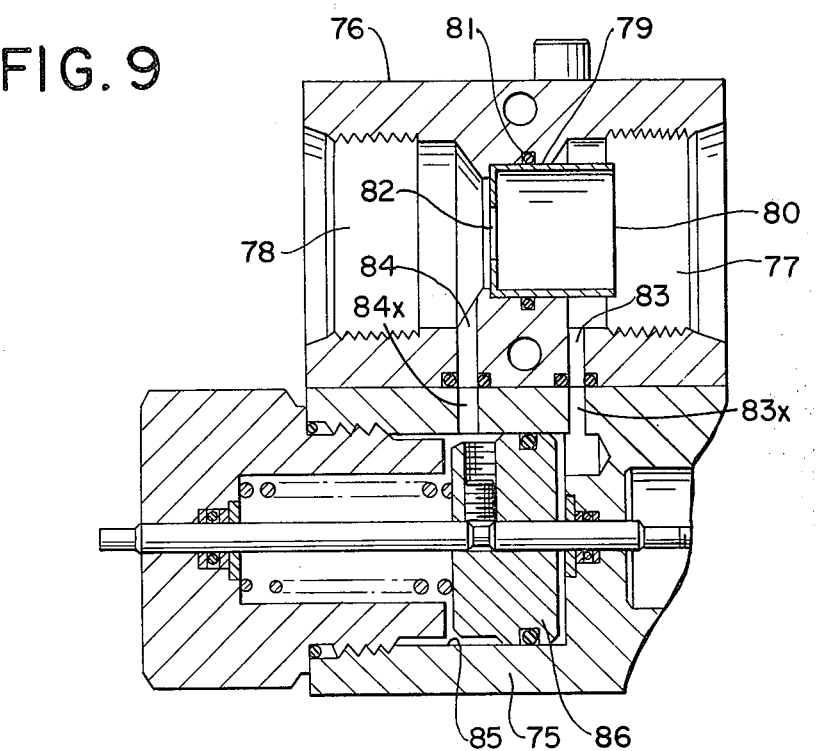
FIG. 9 is a vertical longitudinal sectional view, similar to FIG. 3, illustrating a modification of the invention.

Referring to FIG. 9, a modification of the invention for more direct flow of working hydraulic fluid and the elimination of the needle valve and substitution of a fixed orifice, are illustrated. In this structure the body of the combined sensor and control can be made in two separate parts bolted together. For example, the body portion 75 may contain only the mechanism operated by the pressure drop across the orifice and the body portion 76 may contain the orifice by which the drop is obtained. In such an instance, the body portion 76 has an inlet bore 77 and a coaxial outlet bore 78. Disposed in coaxial relation between the bores 77 and 78 is a reduced bore 79 in which is fitted a detachable orifice cup 80 which is sealed about its periphery with an O-ring 81. This cup 80 has a thin bottom wall in which is an orifice 82 which is coaxial with the bores 77 and 78 so that working hydraulic fluid can pass directly through the orifice and out of the bore 78. The body portion 76 is provided with an upstream duct 83 connected to the inlet 77 and a downstream duct 84 connected to the outlet bore 78. These ducts communicate with ducts 83x and 84x, respectively, in the body portion 75 so that the latter form continuations of the former, respectively. The ducts 83x and 84x communicate with a cylinder or bore 85, corresponding to the bore 20, at opposite sides of a piston 86.

It is apparent from this arrangement that, if desired, the body portion 76 may be placed at one location and the ducts 83 and 84 thereof connected by suitable pipe lines or hoses to the corresponding continuations 83x and 84x of the body portion 75 when it is located at a point remote from the body portion 76. Thus the control mechanism in the portion 75 may be placed in a very protected location and only the body portion 76, for sensing flow, placed where it is actually subjected to road splash and other contaminations. Since the portion 76 is sealed and free from moving parts, any external contamination cannot effect its functioning. For example, the body portion 76 may be located very close to pump or to the point of application of the working hydraulic fluid so that it is more promptly responsive to the changes of the load or slippage changes in the pump delivery, and the body portion 75 may be placed in a protected position such as in the cab of a vehicle.

Generally, in the sale of this modified form of the invention, a selected number of orifice cups 80, each having a different size orifice 82, so as to correspond closely to the anticipated needs of the particular customer, can be supplied, and the selected orifice cup for the particular application installed by the customer.

Figure 12:
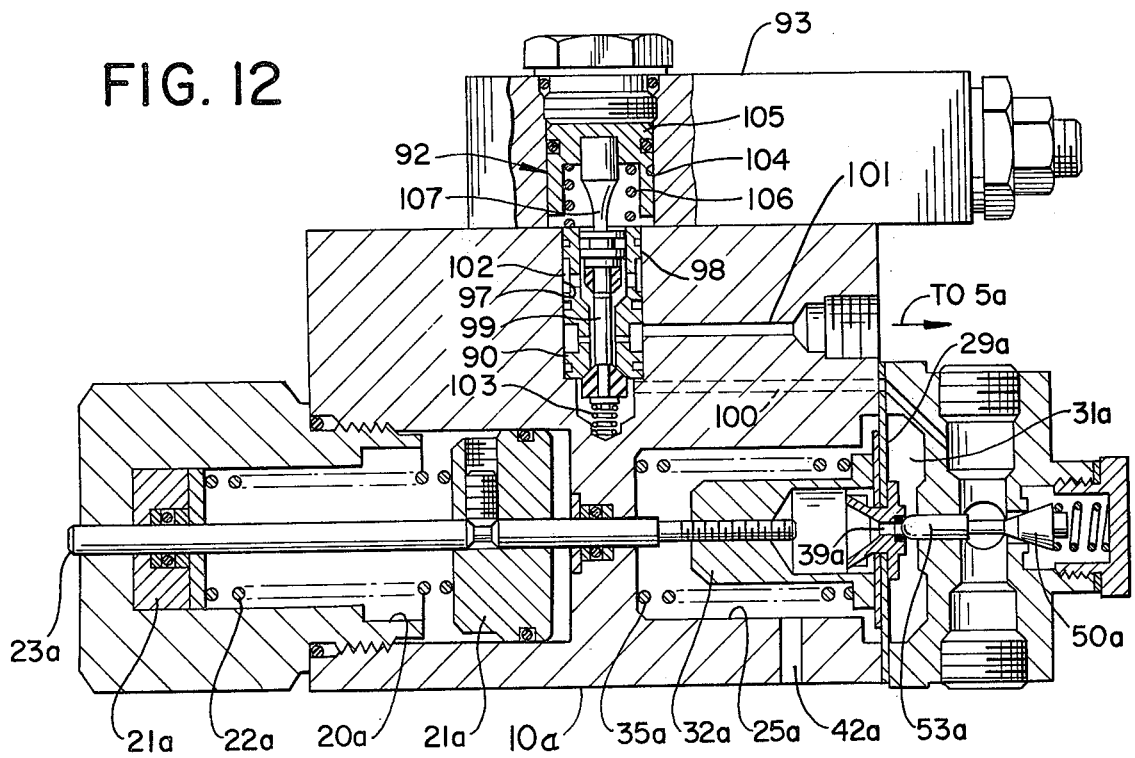
FIG. 12 is a vertical longitudinal sectional view taken on the line 12—12 in FIG. 11.
Figure 10:
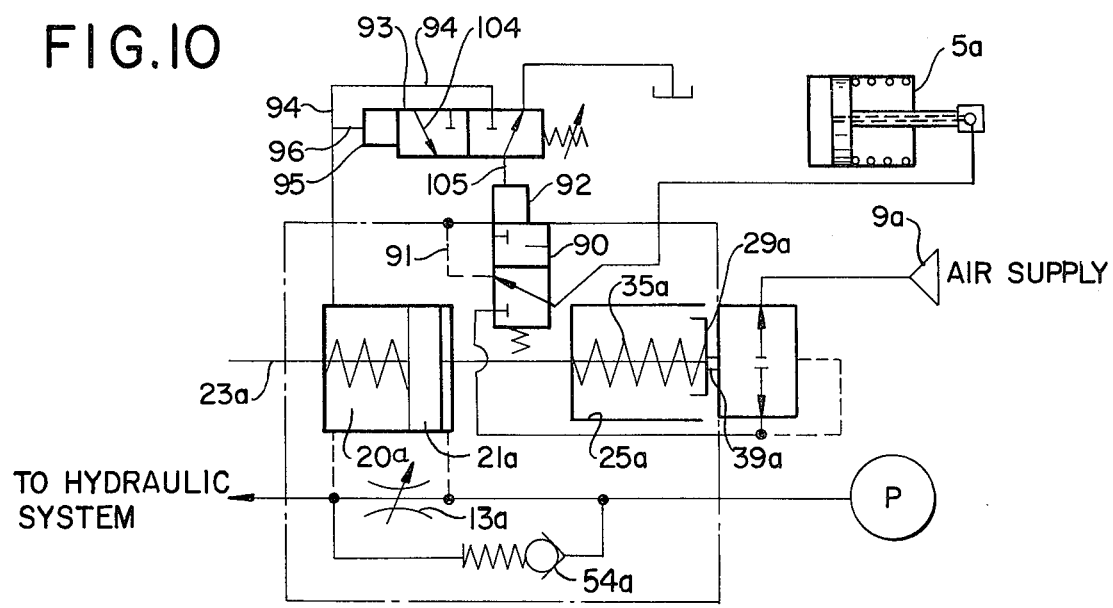
FIG. 10 is a diagram illustrating the use with the combined sensor and control of a line pressure sensor.
Figure 11:
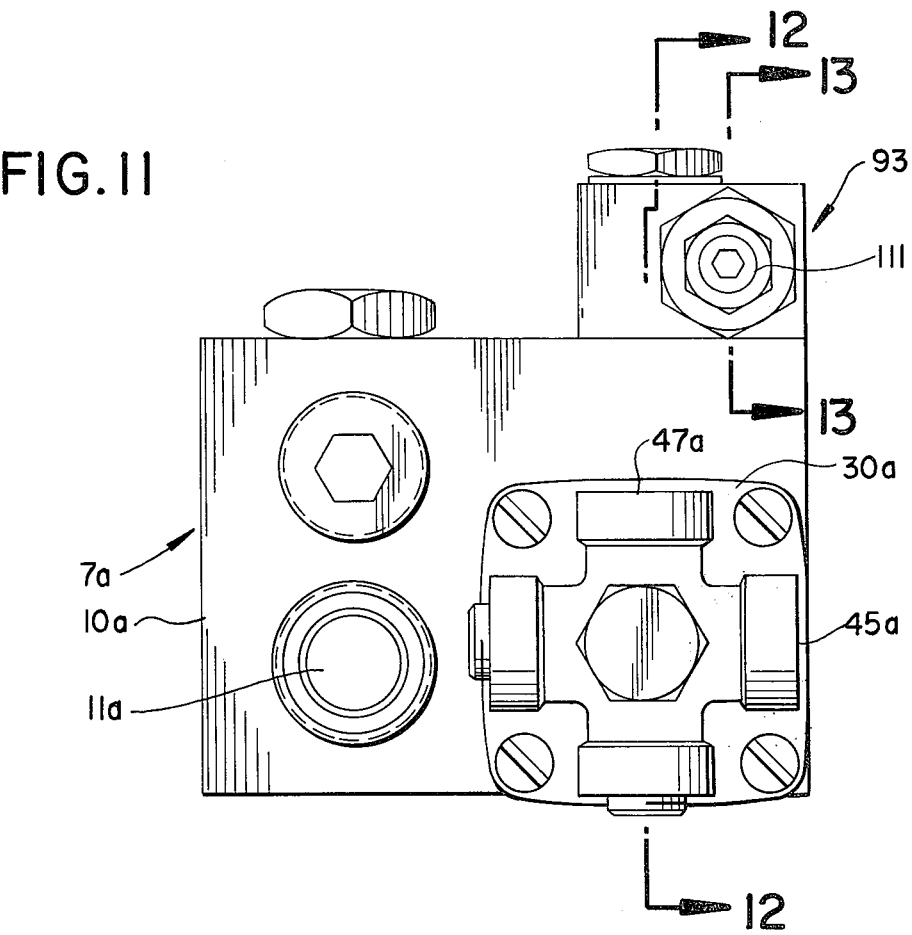
FIG. 11 is an end elevation of the combined sensor and control combined with a working line pressure sensor.

In some cases it is desirable that the air supply in the control circuit be applied to the actuator 5 only when the working hydraulic fluid in the system builds up to a predetermined minimum. Such an arrangement is illustrated in FIGS. 10 through 12, in which the parts corresonding to those illustrated in FIG. 1 are designated by like numbers with the suffix a. In this modification, it is noted that a valve 90, for admitting air pressure initially to the actuator 5a, functions in a like manner to the solenoid valve V in FIG. 1, except that it is not driven by a solenoid. As shown, the valve 90 is spring biased to the position illustrated in FIG. 10, in which case the air at the head end of the piston of the actuator 5a is vented through a line 91 to the atmosphere. The valve 90 is moved by a driver 92 to a position to admit air to the actuator 5a from the air supply 9a. For admitting hydraulic fluid at line pressure to the driver 92, a spring returned sensing valve 93 is provided. The valve 93 normally connects the driver 92 to sump. It is connected to the bore 20a by a duct 94 at the downstream side of the orifice 13a and is operable to connect the duct 94 to the driver 92. For operating the valve 93 in response to line pressure in the system, when the working pressure has exceeded a predetermined minimum, for example, 150 pounds per square inch, which is greater than the working pressure in the hydraulic circuit when it is idle, an operator 95 is connected to the duct 94 by a lateral duct 96.

Figure 13:
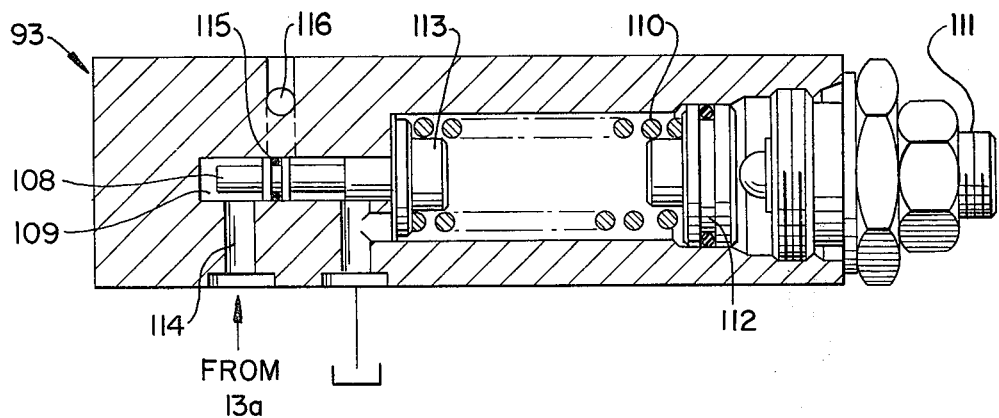
FIG. 13 is a fragmentary vertical longitudinal sectional view taken on the line 13—13 in FIG. 11.

The structures of the valves 90 and 93 and their drivers are best illustrated in FIGS. 11-13. As there shown, the body 10a has a bore 97 in which is mounted a cartridge valve 98 which, in general, comprises a spool 99 having lands at its ends so arranged that when it is depressed, in FIG. 12, air is admitted through a duct 100 from the chamber 31a at the outboard side of the diaphragm 29a, and is discharged through a duct 101 to the actuator 5a. The spool also controls a port 102 which, when the spool returns to its neutral or upper position in FIG. 12, vents the actuator 5a by way of the duct 101. The spool 99 is spring returned to its neutral position by a spring 103 when the line pressure applied to its driver 92 drops below a predetermined setting. The driver 92 comprises a cylinder 104 in which a piston 105 is reciprocable. The piston 105 is biased to an inoperative position by a spring 106. The piston has a pin 107 which bears against the upper end of the spool 99, and which, when hydraulic pressure delivered to the head end of the piston 105 by the valve 93, drives the spool 99 downwardly for admitting control pressurized air from the duct 100 through the duct 101 to the actuator 5a.

The sensor valve 93 and its driver 95 are best illustrated in FIG. 13. The valve 93 and driver 95 are combined in a single sensing spool 108 which is reciprocable in a valve bore 109 and is driven to a centered position by a spring 110. The force applied by the spring 110 is adjustable by an adjusting bolt 111. The bolt 111 bears against a header 112 which bears against one end of the spring 110. The other end of the spring 110 bears against a header 113 which transmits the force of the spring to the inner end of the spool 108. Working pressure fluid in the hydraulic system downstream from the orifice 13a, is admitted to the left or outer end of the spool 108 at all times through a duct 114 which is connected to the duct 96. When this pressure has reached a predetermined amount it drives the spool 108 to the right in FIG. 13, thus connecting the duct 114 to a port 115 which is connected by a duct 116 to the cylinder 104 at the head end of the piston 105 of the driver 92 and thereby operates the valve 90 to admit air to the actuator 5a. When the pressure in the ducts 96 and 114 is reduced below the selected minimum, the spool 108 is returned to the left to its original position and connects the duct 116 and port 115 to sump, so that the piston 105 returns to starting position, thereby permitting the spool 99 to return to starting position and vent the actuator 5a to the atmosphere.

Figure 14:
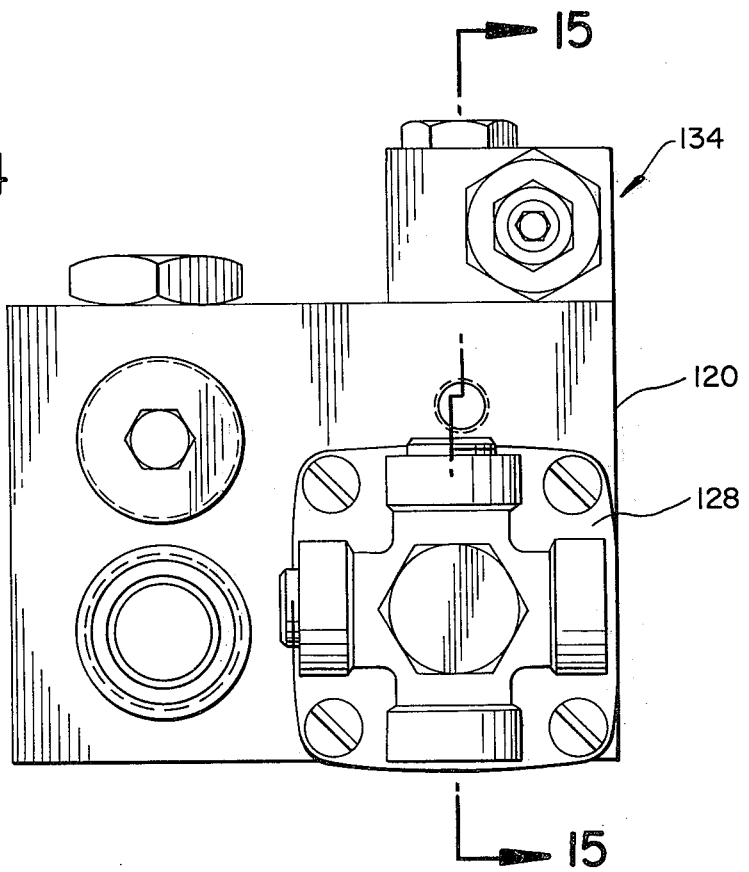
FIG. 14 is a right end elevation of the modified form of combined sensor and control for controlling a vacuum pressure control circuit.
Figure 15:
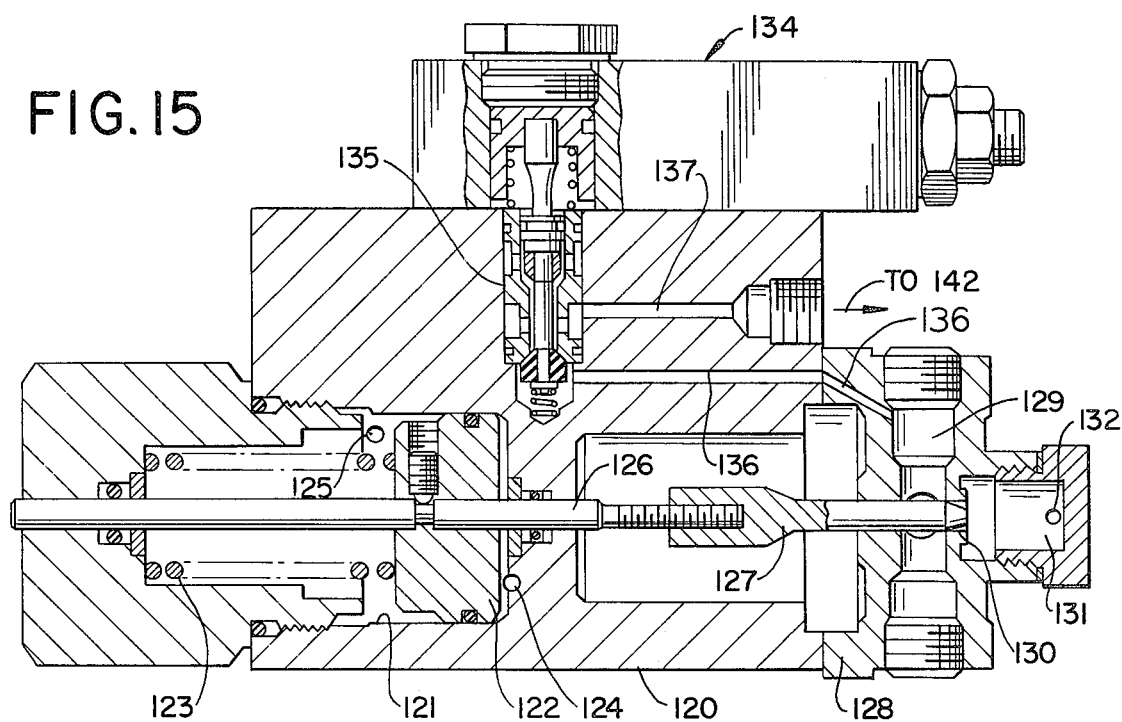
FIG. 15 is a vertical longitudinal sectional view taken on the line 15—15 of FIG. 14.
Figure 16:
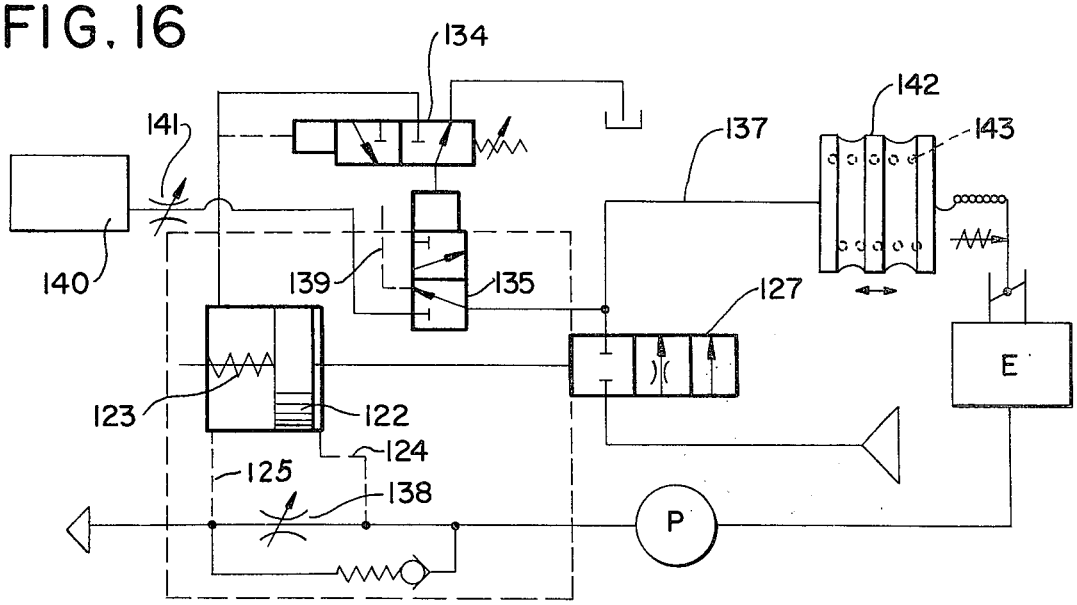
FIG. 16 is a diagrammatic illustration of a hydraulic circuit controlled by the combined sensor and control of FIGS. 14 and 15.

Referring next to the combined sensor or control as applied to a pneumatic control circuit of the negative pressure or vacuum type, the sensing mechanism is essentially the same as for the pneumatic control. As illustrated in FIGS. 14-16, a sensor body 120 is provided with a cylinder bore 121 in which is reciprocable a piston 122. A spring 123 biases the piston 122 to the inner end of the cylinder bore 121 to the right in FIG. 15. A sensing duct 124 connects the hydraulic power circuit at the upstream side of the restricted orifice to the inner end of the cylinder bore 121. A sensing duct 125 connects the hydraulic power circuit at the downstream side of the restricted orifice to the cylinder bore 121 at the side of the piston 122 at which the spring 123 is disposed. Thus, upon a decrease in load, the pressure drop between the ducts 124 and 125 increases and as a result the piston 122 is moved to the left against the bias of the spring 123. Upon an increase in the load, the pressure drop across the orifice, sensed by the ducts 124 and 125, decreases in which case the spring moves the piston 122 to the right. The structure thus far described is the same as in the embodiment of FIGS. 1 through 10.

The piston 122 has a rod 126 which is connected to a spool valve 127. Mounted on the body is a cap 128 having a transverse or vacuum bore 129 and a valve bore 130 which intersects the bore 129. The bore 130 is connected at its inlet end with the chamber 131 which is connected through a duct 132 to the outside air, preferably through a filter. The bore 129 is connected to an actuator for the throttle of the engine, later to be described, and to a vacuum source. Thus, upon an increase in the hydraulic pressure drop across the orifice, as when the load is suddenly reduced, the piston 122 moves the spool of the valve 127 to the left in FIG. 15, and therefore bleeds atmospheric air from the chamber 131 into the bore 129, thereby reducing the vacuum which is connected to the actuator. The actuator is such that a reduction in negative pressure results in the closing of the throttle to the engine and an increase in negative pressure opens the throttle of the engine.

If desired, this form of the invention also may include a working hydraulic fluid pressure sensor valve 134 equivalent to the fluid pressure sensor valve 93 heretofore described, and operated in like manner, and, in turn, operating a cartridge type valve 135 comparable to the spool 99 heretofore described, and which is operated when the operative hydraulic fluid pressure increases to its predetermined degree to connect the bore 129 by way of a duct 136 to a duct 137 which leads to the actuator.

The circuitry for this structure is illustrated in FIG. 16. As therein shown the engine E drives a pump P which supplies working hydraulic fluid to the load or system through a restricted orifice 138, thereby resulting in a pressure drop from the upstream to the downstream side of the orifice 138. These pressure drops are applied to the piston 122 and cause it to operate a spool valve 127. In the raised position of the spool of the cartridge valve 135, it connects the line 137 to a vent duct 139 leading to the atmosphere. In the lowered position, it connects line 137 to a vacuum source 140, which may be a separate vacuum tank or a manifold of the engine, to the actuator. If the vacuum source is the manifold of the engine E, then a modulating orifice 141 is provided in the line so that the operation of the engine is not unduly affected by venting of the vacuum for operating the actuator. The actuator, indicated at 142, is in the form of a bellows which is moved to expanded position by a suitable spring 143 which, as it expands, permits the throttle to be returned by its usual spring return to closed position. When the bellows is contracted it tends to open the throttle.

In this structure, upon a decrease in load, the pressure drop across the orifice increases, thereby forcing the piston 122 against the bias of its spring 123, to the left, opening the spool valve 127, so as to admit air therethrough into the bore 129, and through the ducts 136 and 137 to the actuator 142. This reduces the vacuum in the actuator and as a result the throttle is moved toward closing position to reduce the engine speed. On the contrary, if the load is increased, the pressure drop across the orifice 138 decreases. Thereupon the piston 122 is moved to the right by its spring 123, moving the spool 127 toward closing position, reducing the bleeding in of atmospheric air. As a result, the negative pressure applied to the actuator 142 is increased, thereby collapsing the bellows of the actuator 142 and opening the engine throttle so as to speed up the engine to handle the heavier load while maintaining the same rate of flow as theretofore. By this arrangement, a balance is soon maintained for any given setting of the adjustable needle valve or selected fixed orifice, so that the engine speed is so controlled as to maintain a substantially constant flow regardless of the load applied.

Having thus described my invention, I claim:

1. In combination, a variable speed engine;
   a power input control therefor;
   a hydraulic pump driven by the engine;
   a hydraulic power mechanism for driving a variable load;
   a hydraulic power circuit connecting the pump and mechanism;
   a hydraulic flow sensor connected in the hydraulic power circuit and operative to sense variations in the rate of flow of working hydraulic fluid in said circuit;
   actuating means controlled by the sensor and operative in response to variations in the sensed rate of flow to actuate said power input control to increase the output to said engine upon a decrease in said sensed rate of flow below a preselected rate and to decrease the input to said engine upon an increase in said rate of flow above said preselected rate;
   characterized in that said actuating means includes,
   a control fluid circuit which is connectable to an extraneous source of control fluid pressure and which is isolated from said hydraulic power circuit;
   a fluid pressure regulator connected to the sensor and to said control circuit and operative in response to changes in said sensed rate of flow to vary the pressure of the fluid delivered by said control circuit in an analogous relation to slight variations in said rate of flow; and
   an actuator connected in said control circuit to receive said delivered control pressure fluid, and responsive to variations in pressure of said delivered control pressure fluid, and drivingly connected to said input power control of the engine.

2. The structure according to claim 1 wherein the control circuit is a pneumatic circuit and said actuator is pneumatically operated.

3. The structure according to claim 1 wherein said sensor includes,
   orifice means which produce pressure differentials in the hydraulic fluid passing therethrough analogous to changes in said rate of flow of said hydraulic fluid; and
   said hydraulic power mechanism is operated in response to said differentials.

4. A combined flow sensor and control comprising:
   a hydraulic circuit adapted to be connected between a working hydraulic pressure fluid source and a load;
   a flow sensor connected in the circuit so that working hydraulic fluid flow in the circuit is constrained to pass through the sensor;
   orifice means in said sensor operative to produce pressure differentials in the working hydraulic fluid flowing through the sensor analogous to variations in the rate of flow of said hydraulic fluid through said orifice means;
   said sensor including an element arranged to be subjected to said pressure differentials and to be driven in one direction by said differentials in pressure;

resilient means biasing the element in the opposite direction;

a control fluid circuit isolated from the hydraulic circuit and adapted to be connected to a control fluid pressure source and having an outlet port;

a pressure regulator in said control fluid circuit and movable to different positions for controlling the pressure of the control fluid delivered to said port; and means drivingly interconnecting the element and regulator so as to vary the control pressure delivered to said port in an analogous relation to changes in the rate of flow of said working hydraulic fluid through said orifice means.

5. A flow sensing control according to claim 4 wherein said sensor includes a body having a cavity with an inlet and an outlet for passage of working hydraulic pressure fluid through the cavity;

said orifice means includes a restricted flow orifice in the cavity between the inlet and outlet and through which fluid passing from the inlet to the outlet is constrained to pass;

said body has a pair of ducts, one having an inlet into the cavity at the inlet side of the orifice and the other having an inlet into the cavity at the outlet side of the orifice, whereby upon the flow of working hydraulic fluid through the cavity from the inlet to the outlet, the pressure drop across the orifice will occur and will increase and decrease in relation to increases and decreases, respectively, in the rate of flow and will be reflected in said ducts;

said element includes a hydraulic cylinder and a piston reciprocable therein;

said ducts are connected to said cylinder at opposite sides of the piston, and the piston is movable in response to said pressure differentials across the orifice;

said regulator includes a control fluid circuit having an outlet adapted to be connected to a fluid pressure actuated actuator, and has an inlet adapted to be connected to a source of control fluid pressure;

an inlet valve in the regulator operable when driven in one direction to open the inlet of the control circuit, and when moved in the opposite direction to close said inlet;

said regulator has a chamber in communication with said conduit;

a diaphragm closes one side of the chamber and is movable to extended and retracted positions, respectively;

a by-pass duct means is carried by, and opens through, the diaphragm;

said valve means further includes a valve plug cooperable with the inlet of said by-pass means to block the by-pass of control pressure fluid therethrough in normal and retracted positions of the diaphragm and to open the by-pass duct in extended positions of the diaphragm;

means drivingly interconnect the piston and diaphragm for moving the diaphragm to retracted positions upon movements of the piston toward the diaphragm;

means interconnecting the valve and plug for closing the by-pass and moving the valve to open position upon movement of the diaphragm by the piston predetermined distances toward retracted position; and for closing the valve and opening the by-pass means upon predetermined movement of the diaphragm toward extended position.

6. The structure according to claim 5 wherein the piston is directly mechanically connected to the diaphragm for movement therewith;

the valve has a stem and the plug is on one end of the stem;

the by-pass means in the diaphragm has a seat exposed toward and engageable by the plug, and spaced axially relative to the plug when the valve is closed and the diaphragm is in an intermediate position;

said seat engages the plug upon initial movement of the diaphragm from said intermediate position toward fully retracted position, and closes the by-pass means while the valve plug is seated, and, during additional predetermined movement of the diaphragm toward fully retracted position, maintains the by-pass closed and progressively opens the valve.

7. The structure according to claim 5 wherein spring means bias the piston toward the diaphragm and the diaphragm to its retracted position; and supplemental spring means bias the valve to closed position and the plug toward the diaphragm.

8. A hydraulic fluid flow sensor and control comprising;

a first means having a cavity with an inlet, an outlet, and a wall therebetween with a flow orifice therein connecting the inlet and outlet;

first and second conduits, the first conduit being connected at one of its ends to said cavity at the inlet side of the orifice, and the second conduit being connected at one of its ends to the cavity at the outlet side of the orifice;

a second means having a first bore and a second bore coaxial therewith;

the other ends of the conduits being connected to said first bore at axially spaced positions, respectively;

a piston reciprocable in said first bore and disposed between said other ends of the ducts;

a diaphragm closing the end of the second bore which is more remote from the first bore, and having an inner face facing toward the piston;

an axial passage between and connecting the bores;

a rod reciprocable in the passage and connected to the piston and to the diaphragm;

means blocking passage of fluid from the first bore to the second bore through said passage around the rod;

resilient means biasing the piston, rod, and diaphragm concurrently in one direction axially of the bores, which direction is the direction of movement of the piston toward the connection of the end of the first conduit with said first bore;

said second means having a chamber at the outer end of the second bore and said diaphragm being connected between the outer end of the second bore and the chamber and forming a common wall therebetween;

said second means having a discharge passage leading from the chamber to the exterior of the second means at the outer side of the diaphragm, and having a vent duct at the inner side of the diaphragm and leading from said second bore to the atmosphere;

said disphragm having a by-pass passage therethrough which, when open, connects said second bore and chamber;

said second means having a chamber inlet passage coaxial with said second bore;

a valve reciprocable therein and operable to open and close said chamber inlet passage, respectively;

a spring biasing the valve in a direction toward the diaphragm to closed position;

said valve having a stem with a plug portion thereon which, in the closed position of the valve and intermediate position of the diaphragm, closes said bypass passage through the diaphragm; and said diaphragm being movable, upon predetermined pressure in said first conduit, so as to cause said by-pass passage to be moved away from said plug to open condition, against the biasing force of said resilient means.

9. A combined sensor and control including a body adapted to be connected in a hydraulic power circuit, and having a cavity with an inlet and an outlet, and a restricted flow orifice between the inlet and outlet through which hydraulic working fluid must pass in flowing through the cavity;

a control supply means adapted to be connected to an external source of control fluid pressure and operable to change the pressure of control pressure fluid delivered to an extraneous actuator; and a pressure responsive means in the body and subjected to differentials in pressure in the hydraulic working fluid at opposite sides of the orifice, and operative in response thereto for operating the control supply means so as to change the delivered control fluid pressure in one direction from normal upon a decrease in said differential pressure, and in the opposite direction from normal upon an increase in said differential pressure.

10. A sensor according to claim 9, wherein the control supply means includes a second pressure responsive means operative by delivered controlled fluid pressure to apply the delivered controlled fluid pressure to the first pressure responsive means in cumulative relation thereto.

11. A combined sensor and control comprising:

sensing means through which working hydraulic pressure fluid can flow from a source to a hydraulically operable power mechanism through a restrictive orifice, and which senses changes in the rate of flow of the hydraulic fluid as a function of the changes in the differential in hydraulic pressure across said orifice;

a pneumatic pressure varying device connectable to a pneumatic pressure fluid source and operative to vary the pneumatic pressure from the source delivered to a device to be operated; and means interconnecting the sensing means and pneumatic pressure varying device so as to maintain the magnitude of said pneumatic pressure in an analogous relation to the magnitude of said differential in hydraulic pressure.

* * * * *